United States Patent
Bhardwaj et al.

(10) Patent No.: US 9,369,506 B2
(45) Date of Patent: Jun. 14, 2016

(54) INSERTION OF SUPPLEMENTARY CONTENT INTO A SEGMENTED CONTENT STREAM

(71) Applicant: Adobe Systems Incorporated, San Jose, CA (US)

(72) Inventors: Anjali Bhardwaj, Pacifica, CA (US); Seth E. Hodgson, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 493 days.

(21) Appl. No.: 13/910,474

(22) Filed: Jun. 5, 2013

(65) Prior Publication Data
US 2014/0365675 A1    Dec. 11, 2014

(51) Int. Cl.
| | |
|---|---|
| G06F 15/16 | (2006.01) |
| H04L 29/06 | (2006.01) |
| H04N 21/234 | (2011.01) |
| H04N 21/2343 | (2011.01) |
| H04N 21/262 | (2011.01) |
| H04N 21/2668 | (2011.01) |
| H04N 21/44 | (2011.01) |
| H04N 21/462 | (2011.01) |
| H04N 21/81 | (2011.01) |
| H04N 21/845 | (2011.01) |

(52) U.S. Cl.
CPC ............... *H04L 65/60* (2013.01); *H04L 65/601* (2013.01); *H04N 21/23424* (2013.01); *H04N 21/23439* (2013.01); *H04N 21/2668* (2013.01); *H04N 21/26258* (2013.01); *H04N 21/44016* (2013.01); *H04N 21/4622* (2013.01); *H04N 21/812* (2013.01); *H04N 21/8456* (2013.01)

(58) Field of Classification Search
CPC  H04L 60/60; H04L 60/601; H04N 21/23424; H04N 21/23439; H04N 21/26258; H04N 21/2668; H04N 21/44016; H04N 21/4622; H04N 21/812; H04N 21/8456
USPC .......................................................... 709/231
See application file for complete search history.

(56) References Cited

U.S. PATENT DOCUMENTS

| | | | | |
|---|---|---|---|---|
| 8,645,991 | B2 * | 2/2014 | McIntire | ............ H04N 7/17318 725/34 |
| 2007/0250901 | A1 * | 10/2007 | McIntire | ............ H04N 7/17318 725/146 |

* cited by examiner

*Primary Examiner* — Kristie Shingles
(74) *Attorney, Agent, or Firm* — Wolfe-SBMC

(57) ABSTRACT

Techniques for insertion of supplementary content into a segmented content stream are described. In at least some embodiments, a content stream includes primary content, such as streaming web content, a movie, an event broadcast (live and/or recorded), a television program, and so on. The content stream can be segmented, such as via techniques for adaptive bitrate streaming. Techniques discussed herein enable supplementary content, such as an advertisement, to be inserted into the content stream. The supplementary content can be inserted at any specified time point, even if the specified time point falls within a segment of the content stream. Techniques further enable playback of the content stream to be paused during playback of the supplementary content, and to resume after playback of the supplementary content.

20 Claims, 9 Drawing Sheets

INSERTION OF SUPPLEMENTARY CONTENT INTO A SEGMENTED CONTENT STREAM

BACKGROUND

Consumers today have access to a tremendous variety of content, such as television programs, movies, sports broadcasts, and so forth. While a variety of content delivery methods are available, content streaming is quickly becoming a primary avenue via which many consumers obtain and consume content. Content streaming enables content to be retrieved from a variety of resources via a media stream, such as from various web-based content resources.

While content streaming provides a convenient and flexible way for obtaining content, it also presents a number of implementation challenges. For example, the quality of a consumer content streaming experience can be affected if significant variations in streaming resources (e.g., data bandwidth, available central processing unit (CPU) capacity, and so forth) occur while content is being streamed.

Different techniques for compensating for such variations in streaming resources have been developed. One such technique is adaptive bitrate streaming, which can be implemented in a variety of different ways. Typically, adaptive bitrate streaming involves encoding an instance of content at multiple different bitrates to generate multiple bitrate streams. Generally, the bitrate streams correspond to versions of the instance of content at different bitrates. Each of the bitrate streams is then segmented into multiple discrete segments. When playback of the instance of content is initiated on a device, a bitrate stream can be selected and streamed based on streaming resources currently available to the device, e.g., network bandwidth, CPU bandwidth, and so forth. For instance, the bitrate stream can be transmitted to the device on a segment-by-segment basis.

If a variation in streaming resources occurs while the bitrate stream is being transmitted, a different bitrate stream can be selected and streamed in place of the original bitrate stream. For instance, if network bandwidth significantly decreases, a lower bandwidth bitrate stream can be streamed. Similarly, if network bandwidth significantly increases, a higher bandwidth bitrate stream can be streamed. Segmentation of the different bitrate streams enables switching between different bitrate streams to occur at segment boundaries, e.g., when a particular segment of a currently streaming bitrate stream finishes playback.

While adaptive bitrate streaming provides ways for compensating for changes in streaming resources during playback of content, it also presents some challenges to inserting supplementary content (e.g., advertisements) into a content stream. For example, inserting supplementary content into a content stream processed based on current techniques for adaptive bitrate streaming is typically limited to insertion of the supplementary content at a segment boundary.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for insertion of supplementary content into a segmented content stream are described. In at least some embodiments, a content stream includes "primary content," such as streaming web content, a movie, an event broadcast (live and/or recorded), a television program, and so on. The content stream can be segmented, such as via techniques for adaptive bitrate streaming. Techniques discussed herein enable supplementary content, such as an advertisement, to be inserted into the content stream at any specified time point, even if the specified time point falls within a segment of the content stream. Techniques further enable playback of the content stream to be paused during playback of the supplementary content, and to resume after playback of the supplementary content.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
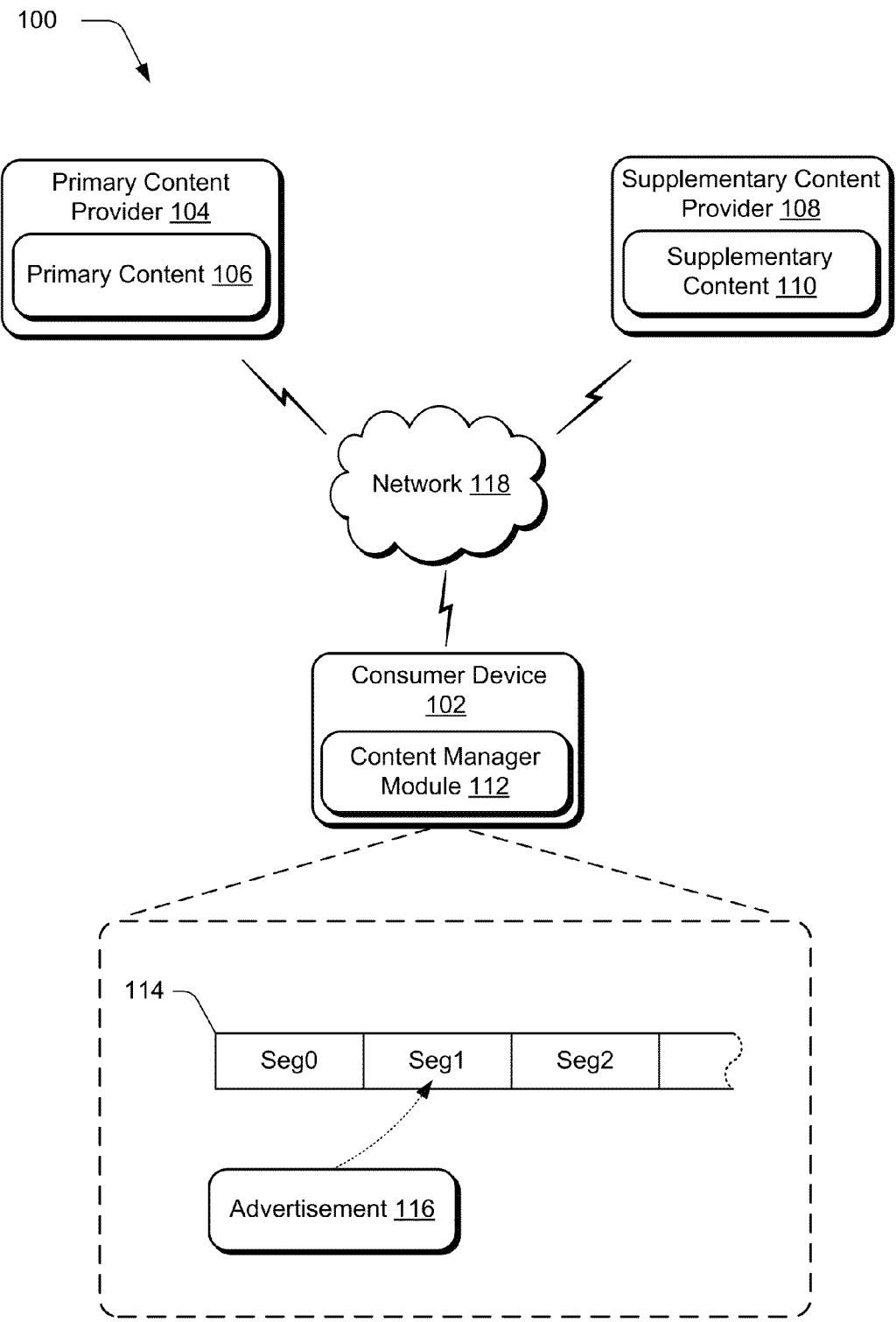
FIG. 1 is an illustration of an environment in an example implementation that is operable to employ techniques discussed herein in accordance with one or more embodiments.

Techniques for insertion of supplementary content into a segmented content stream are described. In at least some embodiments, a content stream includes "primary content," such as streaming web content, a movie, an event broadcast (live and/or recorded), a television program, and so on. The content stream can be segmented, such as via techniques for adaptive bitrate streaming, to enable adjustments to the content stream to be performed if a significant change in a streaming resource (e.g., network bandwidth) occurs. The content stream may further include one or more periods that define a collection of segments. A period, for example, can correspond to a discrete instance of content, such as a movie. The period can be divided into multiple segments that each define a discrete portion of the instance of content, such as a 5 second portion, a 10 second portion, and so forth.

According to one or more embodiments, supplementary content is received to be inserted into a content stream. Generally, supplementary content is content other than primary content. Examples of supplementary content include advertisements, event notifications, public service announcements, and so forth. Techniques discussed herein enable the supplementary content to be inserted at any specified time point within the content stream. The supplementary content, for example, can be inserted at a particular point even if the point falls within a period and/or a segment.

For example, consider a scenario where a content stream includes a period that corresponds to an instance of a television program. The content stream can be streamed from a web resource for consumption by a consumer device, such as a mobile computing device. The period is made up of multiple segments that each includes a discrete portion of the television program. As referenced above, providing content in segments enables adjustments to be made based on a change in streaming resources, such as by switching at a segment boundary between different bitrate versions of the content.

Continuing with the example scenario, consider that an advertisement (i.e., supplementary content) is received to be inserted into the content stream. The advertisement, for example, can be received for insertion after the content stream has been defined by a content provider but prior to the content stream being streamed for consumption. Alternatively or additionally, the advertisement can be received after the content stream has begun streaming to a consuming device.

The advertisement is associated with insertion data that specifies a particular time point in the content stream at which playback of the advertisement is to begin. The insertion data can be specified by an entity that creates and/or distributes the advertisement, an entity that generates and/or distributes the content stream, and/or any other entity.

To enable the advertisement to be inserted into the content stream, the content stream can be processed according to various embodiments. For example, the period can be split into two portions around the particular time point, such that the advertisement can be inserted between the two portions. Further, if the particular time point falls within a segment, the segment can be processed to enable playback of the segment to pause while the advertisement is played. After playback of the advertisement, the content stream can resume playback at the point in the segment at which playback was paused. Thus, embodiments enable supplementary content to be inserted at any specified point in a content stream, and further enable continuity of content stream playback to be maintained when supplementary content is inserted.

In the following discussion, an example environment is first described that is operable to employ techniques described herein. Next, a section entitled "Example Implementation Scenarios" describes some implementation scenarios involving techniques discussed herein which may be employed in the example environment as well as in other environments. Following this, a section entitled "Example Procedures" describes some example methods in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for insertion of supplementary content into a segmented content stream described herein. Environment 100 includes a consumer device 102, which is representative of a device via which a user can consume content. Examples of the consumer device 102 include a television, a desktop PC, a laptop computer, a smartphone, a tablet computer, and so forth. In at least some implementations, a user can navigate the consumer device 102 to a content source to enable content to be provided from the content source to the consumer device 102.

For instance, a user can employ the consumer device 102 to access a primary content provider 104, which is representative of various enterprises and/or services that provide primary content 106 that can be accessed and consumed by devices. Examples of the primary content provider 104 include online content providers, such as websites and/or other web-based enterprises that can generate and distribute content online. The primary content provider 104 may also include television networks, such as a broadcast network, a cable network, a satellite network, and so forth. A variety of other types and implementations of the primary content provider 104 are contemplated within the spirit and scope of the claimed embodiments.

The primary content 106 is representative of different types of content that can be generated and/or distributed by the primary content provider 104. Examples of the primary content 106 include television programs (e.g., pre-recorded programs, live broadcasts, and so forth), sports broadcasts (live and/or recorded), movies, web content (e.g., content distributed via the Internet), and so forth. Generally, the primary content 106 includes any type of content that can be made available for consumption by a device, such as via content streaming to the consumer device 102.

The environment 100 further includes a supplementary content provider 108, which is representative of various enterprises and/or services that provide supplementary content 110 that can be inserted into the primary content 106. Examples of the supplementary content 110 include advertisements, event notifications, public service announcements, and so forth. As detailed elsewhere herein, the supplementary content 110 can be inserted into the primary content 106 during and/or prior to playback of the primary content 106 via the consumer device 102.

The consumer device 102 further includes a content manager module 112, which is representative of functionality to perform various processing on the primary content 106 and enable the supplementary content 110 to be inserted into the primary content 106. For instance, the primary content 106 can be provided to the consumer device 102 via a content stream from the primary content provider 104.

The content manager module 112 can initiate playback of the primary content 106 on the consumer device 102, such as via functionality of the content manager module 112 itself, and/or other media player functionality that may be leveraged by the consumer device 102. Thus, in at least some embodiments, the content manager module 112 can represent an integrated media player that can receive, process, and play the primary content 106. Alternatively or additionally, the content manager module 112 can represent processing functionality that can process the primary content 106 for a different functionality, such as an application and/or service separate from the content manager module 112.

The supplementary content 110 can also be provided to the consumer device 102. As further detailed below, the supplementary content 110 can include instructions indicating how the supplementary content 110 is to be handled. For instance, the supplementary content 110 can identify a particular instance of the primary content 106 into which the supplementary content 110 is to be inserted. The supplementary content 110 can also indicate an insertion point in the primary content 106, such as a particular time at which the supplementary content 110 is to be inserted during playback of the primary content 106. The supplementary content 110 can also include various other types of handling information that can be employed to handle the supplementary content 110, examples of which are discussed below. The content manager module 112 can utilize such information to arrange insertion and playback of the supplementary content 110 during playback of the primary content 106.

For instance, consider that a content stream 114 which represents an instance of the primary content 106 is streamed to the consumer device 102 from the primary content provider 104. As illustrated, the content stream 114 includes multiple segments, such as generated by the primary content provider 104 and prior to being streamed to the consumer device 102. The primary content provider 104, for example, can process an instance of the primary content 106 utilizing techniques for adaptive bitrate streaming, to generate the content stream 114.

An advertisement 116 is also provided to the consumer device 102, such as from the supplementary content provider 108. The advertisement 116, for example, represents an instance of the supplementary content 110. According to one or more embodiments, the advertisement 116 includes and/or is associated with handling information which specifies that the advertisement 116 is to be inserted into the content stream 114 at a particular point in time during playback of the content stream 114. In this particular example, handling information for the advertisement 116 specifies that the advertisement 116 is to be inserted at a time point that occurs within segment 1 ("Seg1") of the content stream 114 during playback of the content stream 114. As detailed herein, embodiments enable the advertisement 116 to be inserted into the content stream 114 during playback of Seg1 such that playback of the content stream 114 is temporarily paused while the advertisement 116 is played on the consumer device 102. Embodiments further enable playback of the content stream 114 to resume at the appropriate portion of Seg1 after playback of the advertisement 116 is complete. Further details concerning insertion of supplementary content and management of primary content are provided below.

The environment 100 further includes one or more networks 118 via which various entities of the environment 100 may communicate. The network(s) 118 may assume a variety of different wired and/or wireless network configurations, such as a local area network (LAN), a wide area network (WAN), the Internet, and so on. Further, although the various entities of the environment 100 are illustrated as discrete devices, this is not intended to be limiting. For instance, functionalities discussed with reference to the environment 100 and/or other portions of the discussion herein may be implemented in a distributed environment (e.g., "in the cloud"), as further described in relation to FIG. 9.

Having described an example environment in which the techniques described herein may operate, consider now a discussion of some example implementation scenarios in accordance with one or more embodiments.

Example Implementation Scenarios

The following discussion describes example implementation scenarios for insertion of supplementary content into a segmented content stream in accordance with one or more embodiments. The implementation scenarios may be employed in the environment 100 of FIG. 1, the system 900 of FIG. 9, and/or any other suitable environment.

Figure 2:
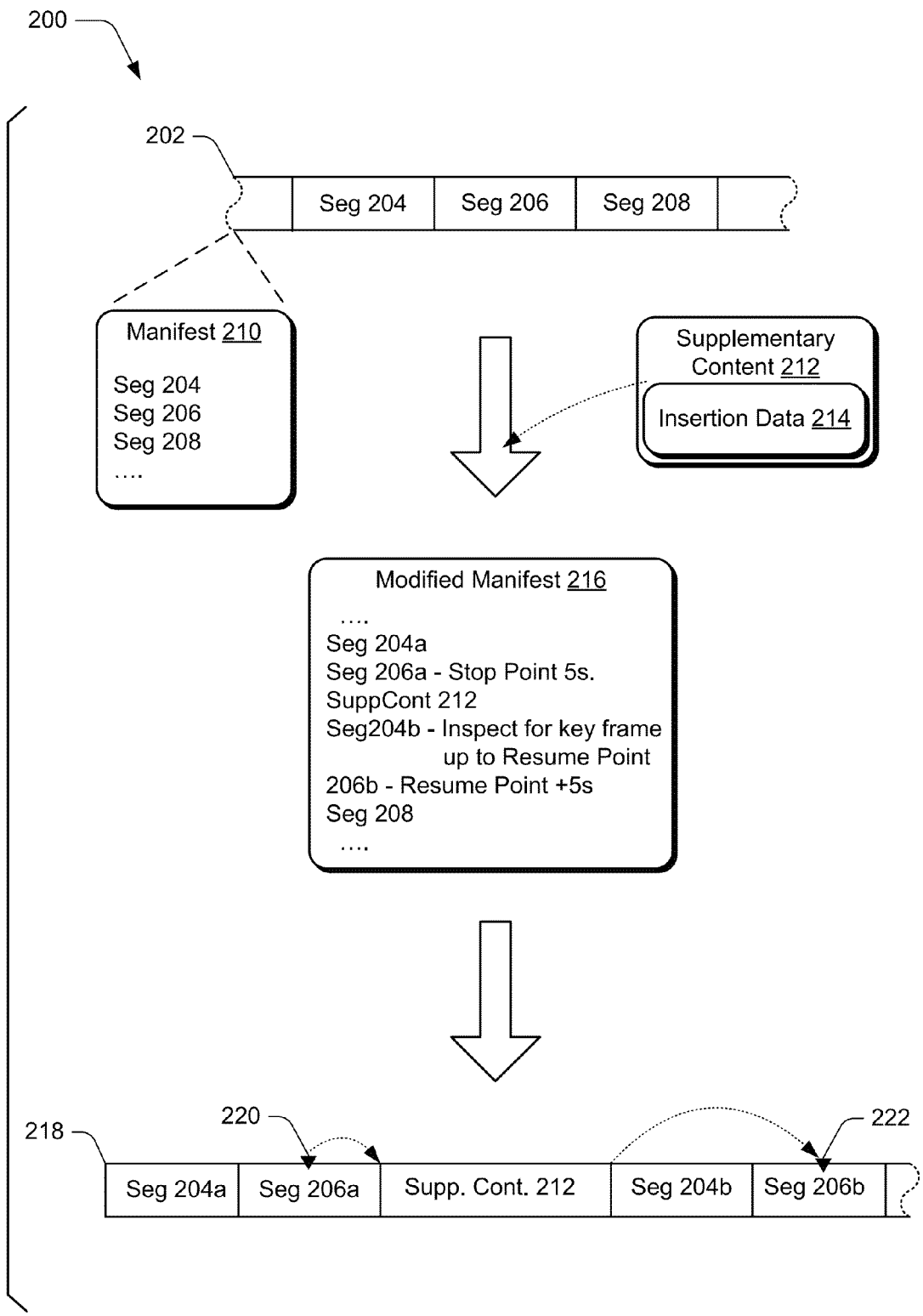
FIG. 2 illustrates an example implementation scenario in accordance with one or more embodiments.

FIG. 2 illustrates an example implementation scenario, generally at 200. Illustrated in the upper portion of the scenario 200 is a content stream 202. The content stream 202, for example, represents an instance of the primary content 106 that is streamed to the consumer device 102. The content stream 202 is segmented into multiple segments, such as via techniques for adaptive bitrate streaming. For instance, the content stream 202 includes a segment 204, a segment 206, and a segment 208, as well as additional segments that are not explicitly illustrated. According to various embodiments, the segments 204, 206, 208 can each represent a particular time period of content playback for the content stream 202, e.g., a 5 second portion, a 10 second portion, and so forth. Thus, segments of the content stream 202 can be played back in succession to present an integrated instance of content.

According to various embodiments, segments of the content stream 202 can be defined with respect to a particular playback time of an associated instance of content. For instance, the segment 204 can correspond to a playback time of 2:40 (two minutes, forth seconds) to 2:50 (two minutes, fifty seconds.) Thus, boundaries of the segment 204 can be defined with regard to their respective playback times, e.g., 2:40 and 2:50. Transitions between segments can thus be detected based on elapsed playback time.

The content stream 202 is associated with a manifest 210, which specifies various types of information for the content stream 202. For instance, the manifest 210 lists segments to be played as part of the content stream 202, as well as an order in which the segments are to be played. The manifest 210 can include various other types of information for the content stream 202, such as security information, authentication information, and so on.

In at least some embodiments, the manifest 210 is dynamically updateable to add and/or delete content from the content stream 202. With reference to the environment 100, the manifest 210 can be generated and/or managed by the primary content provider 104. When the content stream 202 is provided by the primary content provider 104 to various devices (e.g., the consumer device 102), the manifest 210 is also provided to specify how the content stream 202 is to be played. The content manager module 112, for example, can inspect the manifest 210 and manage playback of the content stream 202 based on information from the manifest 210.

Proceeding to the center portion of the scenario 200, supplementary content 212 is received to be inserted into the content stream 202. As referenced above, the supplementary content 212 can include various types of content, such as an advertisement, an event notification, a public service announcement, and so forth. The supplementary content 212 includes insertion data 214, which includes instructions for inserting the supplementary content 212. In the example scenario 200, the insertion data 214 specifies that the supplementary content 212 is to be inserted at a particular time during playback of the content stream 202. In this example, the insertion data specifies that the supplementary content 212 is to be inserted starting at a playback time of 2:55 into playback of the content stream 202.

In the scenario 200, the segment 206 represents a 10 second portion of content that corresponds to a playback time of 2:50-3:00 minutes. Thus, based on the specified playback time for the supplementary content 212 starting at 2:55, the supplementary content 212 is to be played back starting halfway through playback of the segment 206.

Continuing to the lower portion of the scenario 200, the manifest 210 is processed based on the insertion data 214 to generate a modified manifest 216. Generally, the modified manifest 216 represents a modification of an in-memory version of the manifest 210. Thus, in at least some embodiments, the modified manifest 216 is utilized to manage playback of the content stream 202 and the supplementary content 212, but is not stored in persistent storage.

The content manager module 112, for example, can receive the insertion data 214 (e.g., from the supplementary content provider 108), and can process the manifest 210 as described. Thus, in at least some embodiments, the manifest 210 can be received from one source (e.g., the primary content provider 104), while the supplementary content 212 and the insertion data 214 can be received from a different source, e.g., the supplementary content provider 108. This is not to be construed as limiting, however, and primary content, manifests, supplementary content, and insertion data can be received from a variety of different sources and different combinations of sources.

The modified manifest 216 duplicates the segment 204 to generate a segment 204a and a segment 204b, and duplicates the segment 206 to generate a segment 206a and segment 206b. Thus, the segments 204a and 204b represent duplicates of the segment 204, and the segments 206a, 206b represent duplicates of the original segment 206. The modified manifest 216 further indicates that the supplementary content 212 is inserted between the segment 206a and the segment 204b.

The modified manifest 216 indicates a stop point of 5 seconds for the segment 206a, e.g., at which playback of the segment 206a stops and playback of the supplementary content 212 is initiated. The modified manifest 216 further indicates a resume point of plus 5 seconds (+5 s) for the segment 206b, which indicates a point at which playback of the segment 206b is initiated after playback of the supplementary content 212 is complete. As further detailed below, the modified manifest 216 indicates that the segment 204b is to be processed to retrieve a key frame and determine a resume context, but is not to be played back. Thus, the modified manifest 216 inserts the supplementary content 212 while preserving the respective streaming order of the original segments of the content stream 202.

Further illustrated in the lower portion of the scenario 200, the content stream 202 is processed based on the modified manifest 216. The content manager module 112, for example, utilizes the modified manifest 216 to process the content stream 202 to generate a modified content stream 218. For instance, the modified content stream 218 represents playback of segments and supplementary content as specified by the modified manifest 216.

The modified content stream 218 includes the segments 204a, 206a, 204b, 206b, as well as other segments not expressly illustrated. The modified content stream 218 further includes the supplementary content 212 between the segments 206a, 204b.

Further illustrated is a stop point 220 in the segment 206a. As referenced above, the stop point 220 corresponds to a point at which playback of the segment 206a stops and playback of the supplementary content 212 is initiated. The modified manifest 216 specifies that the stop point 220 corresponds to 5 s into playback of the segment 206a. Thus, portions of the segment 206a after the stop point 220 are not played back, e.g., are skipped during playback. In at least some embodiments, the stop point 220 is determined from the beginning of the segment 206a. Alternatively or additionally, embodiments may determine the stop point 220 from the end of the segment 206a.

Further illustrated is a resume point 222 in the segment 206b, which indicates a point at which playback of the segment 206b is initiated after playback of the supplementary content 212 is complete. As specified by the modified manifest 216, the resume point 222 corresponds to 5 s from the beginning of the segment 206b. Thus, the segment 204b and portions of the segment 206b before the resume point 222 are not played back, e.g., are skipped during playback. In at least some embodiments, the resume point 222 is determined from the beginning of the segment 206b. Alternatively or additionally, embodiments may determine the resume point 222 from the end of the segment 206b.

As explained in detail below, resuming playback of the modified content stream 218 from the resume point 222 involves obtaining a key frame and processing the key frame and subsequent portions of the modified content stream 218 up to the resume point 222 such that playback can resume with a correct playback context. Accordingly, the segment 204b is generated and included in the modified content stream 218 to enable a key frame to be obtained should a key frame in the segment 206b occur after the resume point 222. Thus, the segment 204b is not played back, but can be used to obtain a resume context (e.g., a "group of pictures" (GOP)) up to the resume point 222 to enable playback of the segment 206b to resume from the resume point 222. Further details concerning obtaining a key frame and playback of the modified content stream 218 are discussed below.

In at least some embodiments, the modified manifest 216 and/or the modified content stream 218 can be generated prior to initiating playback of the content stream 202. The content manager module 112, for example, can process the manifest 210 to generate the modified manifest 216 prior to initiating playback of the content stream 202. Thus, according to techniques discussed herein, the content manager module 112 can modify a content stream to insert supplementary content prior to initiating playback of the content stream.

Alternatively or additionally, processing of the manifest 210 and/or the content stream 202 to insert the supplementary content 212 can occur after playback of the content stream 202 is initiated. Thus, the modified manifest 216 and/or the modified content stream 218 can be generated dynamically during playback of the content stream 202.

Figure 3:
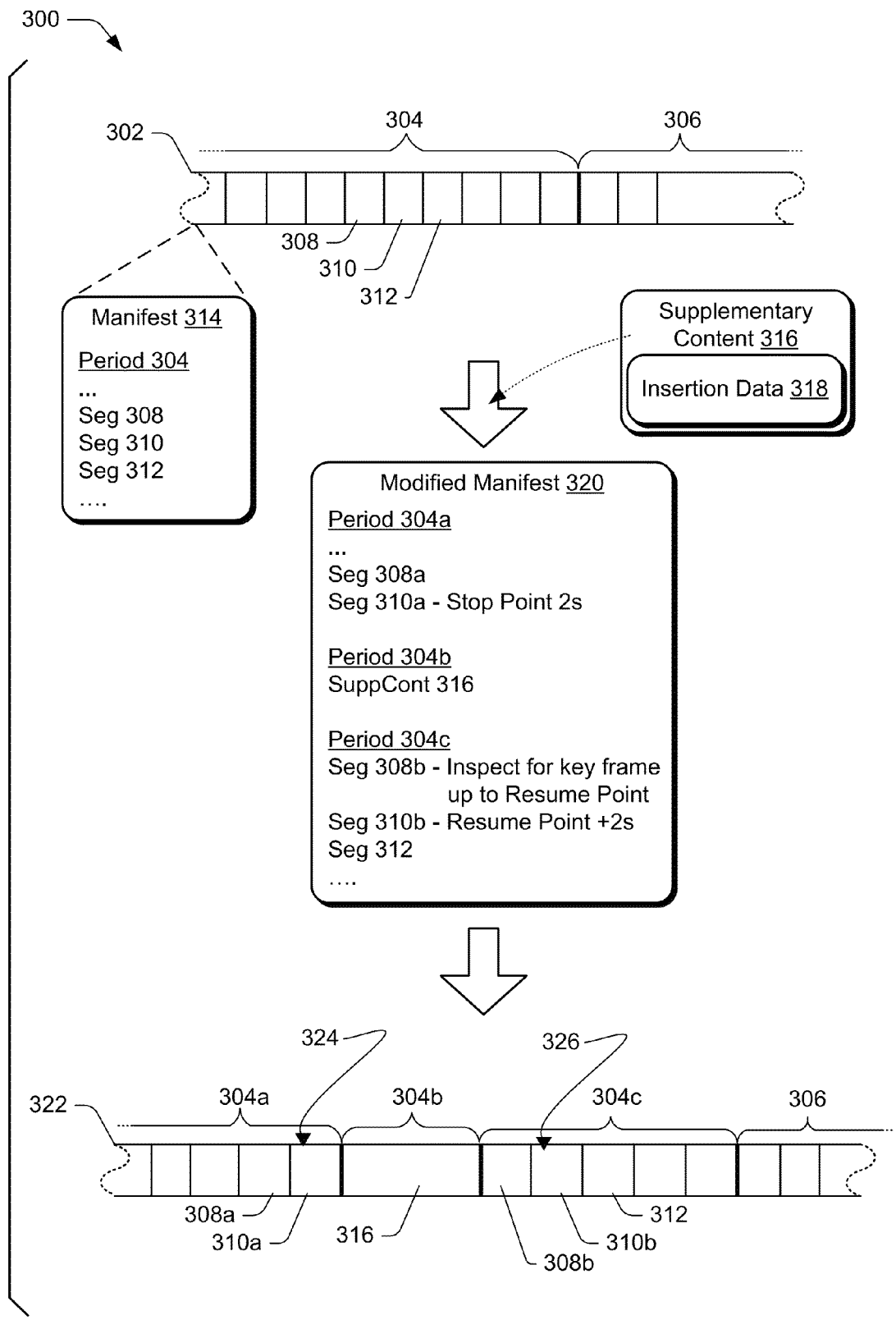
FIG. 3 illustrates an example implementation scenario in accordance with one or more embodiments.

FIG. 3 illustrates a further example implementation scenario, generally at 300. Illustrated in the upper portion of the scenario 300 is a content stream 302. The content stream 302, for example, represents instances of the primary content 106 that can be streamed to the consumer device 102. The content stream 302 is segmented into multiple periods and segments, such as via techniques for adaptive bitrate streaming.

The content stream 302 includes a period 304 and a period 306. The periods 304, 306, for example, can each correspond to discrete instances of the primary content 106. Each of the periods 304, 306 are segmented into multiple segments. The period 304, for example, includes a segment 308, a segment 310, and a segment 312. Each of the segments 308, 310, 312 has a particular time duration, such as 5 seconds, 10 seconds, and so on. Thus, the segments 308, 310, 312 represent discrete portions of an instance of content. For purpose of the scenario 300, and for an instance of content represented by the content stream 302, consider that the segment 308 represents a playback time of 4:20-4:30, the segment 310 represents a playback time of 4:30-4:40, and the segment 312 represents a playback time of 4:40-4:50.

Associated with the period 304 is a manifest 314, which specifies various types of information for the period 304. For instance, the manifest 314 lists segments to be played as part of the period 304, as well as an order in which the segments are to be played. The manifest 314 can include various other types of information for the period 304, such as security information, authentication information, and so forth. According to various embodiments, each of the periods 304 and 306 includes a respective manifest that is specific to the individual period.

Proceeding to the center portion of the scenario 300, supplementary content 316 is received to be inserted into the content stream 302. The supplementary content 316 includes insertion data 318, which includes instructions for inserting the supplementary content 316. In the example scenario 300, the insertion data 318 specifies that the supplementary content 316 is to be inserted at a particular point in the period 304. For example, the insertion data 318 specifies that the supplementary content 316 is to be inserted at 4:32 into playback of the content stream 302. As referenced above, the segment 310 corresponds to a playback time of 4:30-4:40 for the content stream 302. Thus, the supplementary content 316 is to be inserted 2 seconds into playback of the segment 310.

As further illustrated in the center portion of the scenario 300, the manifest 314 is processed using the insertion data 318 to generate a modified manifest 320. The manifest 314 can be processed in a variety of ways and according to a variety of processing scenarios, examples of which are discussed above and below.

The modified manifest 320 splits the period 304 into three periods, a period 304a, a period 304b, and a period 304c. The modified manifest 320 also duplicates the segment 308 into a segment 308a and a segment 308b, and the segment 310 into a segment 310a and a segment 310b. The period 304a includes segments preceding the segment 310 from the original content stream 302, as well as the duplicate segments 308a, 310a. The period 304b includes the supplementary content 316. Further, the period 304c includes the segments 308b, 310b, 312, and subsequent segments from the original content stream 302.

The modified manifest 320 specifies that the segment 310a has a stop point of 2 seconds, indicating that playback of the segment 310a will stop at 2 seconds and playback of the supplementary content 316 will be initiated. The modified manifest 320 further specifies that the segment 310b has a start point of +2 seconds. Thus, after playback of the supplementary content 316 is finished, playback of the segment 310b will be initiated 2 seconds into the segment, e.g., by skipping the first 2 seconds of the segment 310b. As further detailed below, the modified manifest 320 indicates that the segment 308b is to be processed to retrieve a key frame and determine a resume context, but is not to be played back.

Continuing to the lower portion of the scenario 300, the content stream 302 is processed based on the modified manifest 320 to indicate insertion of the supplementary content 316. The content manager module 112, for example, utilizes the modified manifest 320 to process the content stream 302 to generate a modified content stream 322. For instance, the modified content stream 322 represents playback of segments and supplementary content as specified by the modified manifest 320.

The modified content stream 322 includes the periods 304a, 304b, and 304c. Consistent with the modified manifest 320, the period 304a includes the segment 308a and the segment 310a. The segment 310a includes a stop point 324, which corresponds to a point at which playback of the segment 310a stops and playback of the supplementary content 316 is initiated. As specified by the modified manifest 320, the stop point 324 corresponds to 2 s into playback of the segment 310a. Thus, portions of the segment 310a after the stop point 324 are skipped during playback.

The period 304b includes the supplementary content 316. Thus, after playback of the period 304a terminates at the stop point 324, playback of the period 304b is initiated.

The period 304c includes the segments 308b, 310b, 312, and additional segments from the original period 304. The segment 310b includes a resume point 326, which indicates a point at which playback of the segment 310b is initiated after playback of the period 304b is complete. As specified by the modified manifest 320, the resume point 326 corresponds to 2 s from the beginning of the segment 310b. Thus, after playback of the supplementary content 316, the segment 308b and portions of the segment 310b before the resume point 326 are not played back, e.g., are skipped during playback.

As mentioned above and detailed below, resuming playback of the modified content stream 322 from the resume point 326 involves obtaining a key frame and processing the key frame and subsequent portions of the modified content stream 322 up to the resume point 326 such that playback can resume with a correct playback context. Accordingly, the segment 308b is generated and included in the modified content stream 322 to enable a key frame to be obtained should a key frame in the segment 310b occur after the resume point 326. Thus, the segment 308b is not played back, but can be used to obtain a resume context (e.g., a GOP) to enable playback of the segment 310b to resume from the resume point 326. Further details as to playback of the modified content stream 322 are discussed below.

As discussed above with reference to FIG. 2, the modified manifest 320 and/or the modified content stream 322 can be generated prior to playback of the content stream 302 being initiated, and/or after playback of the content stream 302 is initiated, e.g., dynamically. Thus, in at least some embodiments, when a period of a content stream is split into multiple periods to enable insertion of supplementary content, a single manifest can be used and/or modified to specify playback information for the multiple periods.

Figure 4:
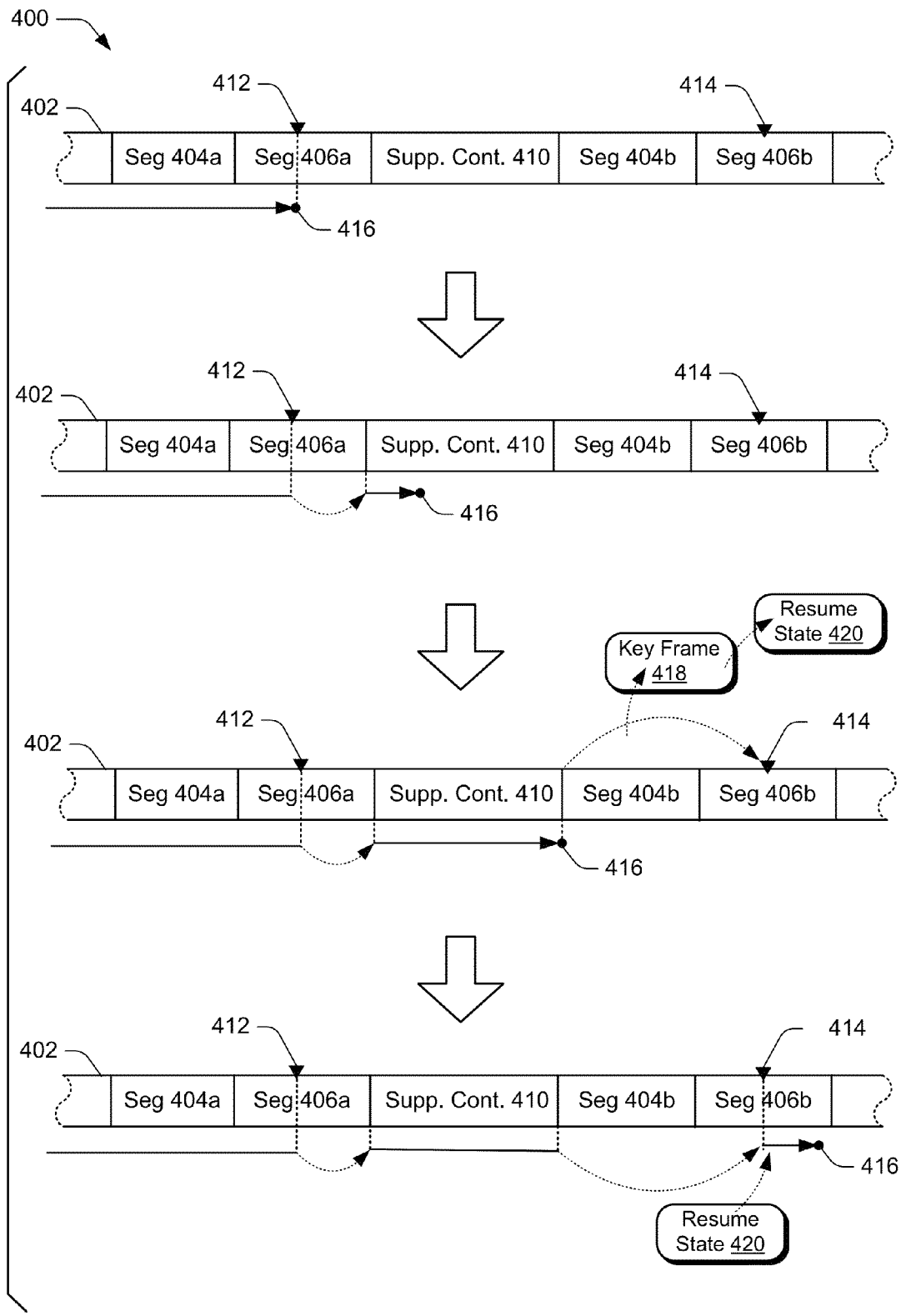
FIG. 4 illustrates an example implementation scenario in accordance with one or more embodiments.

FIG. 4 illustrates a further implementation scenario in accordance with one or more embodiments, generally at 400. According to various embodiments, the scenario 400 describes an example playback of a modified content stream in which supplementary content has been inserted.

The upper portion of the scenario 400 includes a content stream 402. The content stream 402, for example, represents an instance of the primary content 106 that can be streamed to the consumer device 102. The content stream 402 has been processed as discussed above and below to enable insertion of supplementary content.

The content stream 402 includes a segment 404a, a segment 406a, a segment 404b, and a segment 406b. The segments 404a, 404b are copies of a particular segment, and the segments 406a, 406b are copies of another segment generated to enable insertion of supplementary content, as described above and below. The content stream 402 further includes supplementary content 410 that is inserted between the segments 406a, 404b. Although not expressly illustrated, the content stream 402 can be associated with a manifest that specifies how the respective segments and supplementary content are to be played.

The segment 406a includes a stop point 412, which specifies a point at which playback of the segment 406a stops and playback of the supplementary content 410 starts. The segment 406b includes a resume point 414, which specifies a point at which playback of the segment 406b is initiated after playback of the supplementary content 410 is complete.

Further illustrated in the upper portion of the scenario 400 is a playback indicator 416, which indicates a current playback progress in the content stream 402. As indicated by the playback indicator 416, playback of the content stream 402 reaches the stop point 412 in the segment 406a. As referenced above, the stop point 412 can be defined with reference to a particular playback time during playback of the content stream 402.

In the next portion of the scenario 400, and in response to playback reaching the stop point 412, portions of the segment 406a after the stop point 412 are skipped and playback of the supplementary content 410 is initiated.

Proceeding on to the next portion of the scenario 400, playback of the supplementary content 410 is complete. In response, and to enable playback of the content stream 402 to continue from the resume point 414, portions of the content stream 402 from the beginning of the segment 404*b* up the resume point 414 are processed to obtain a key frame 418.

Generally, the key frame 418 provides data upon which playback of other frames of content is based. For instance, the key frame 418 is a content frame that is coded without reference to any other frame, and thus can be rendered and displayed on its own as a complete frame of content. Examples of the key frame 418 include an I-frame, an I-slice, and so forth. In at least some embodiments, playback of other frames of the content stream 402 utilizes data from the key frame 418.

After the key frame 418 is retrieved, content data after the supplementary content but prior to the key frame 418 is discarded. Content data starting from and including the key frame 418 up to the resume point 414 is processed to determine a resume state 420. According to various embodiments, the resume state 420 corresponds to a playback state (e.g., a GOP) of the content stream 402 at the resume point 414, e.g., a video state, an audio state, and so on. Since the content up to the stop point 412 was previously displayed as discussed above, the content is not displayed again as part of the processing.

The scenario 400 proceeds to the bottom portion where playback of the content stream 402 resumes from the resume point 414 and utilizing the resume state 420. For example, playback skips from the end of the supplementary content 410 to the resume point 414, without playing the segment 404*b* or portions of the segment 406*b* that occur before the resume point 414. Utilizing the resume state 420 provides a data context for processing and output of the segment 406*b* from the resume point 414, as well as subsequent portions of the content stream 402.

Thus, the scenario 400 describes an example way in which supplementary content can be inserted at any arbitrary point in an existing content stream, and playback of the content stream can be adjusted to accommodate the supplementary content.

The content streams, segments, periods, and supplementary content illustrated in the accompanying figures are presented for purpose of example only, and are not illustrated to scale or intended to be construed as limiting on the claimed subject matter.

Having discussed some example implementation scenarios, consider now a discussion of some example procedures in accordance with one or more embodiments.

Example Procedures

Figure 5:
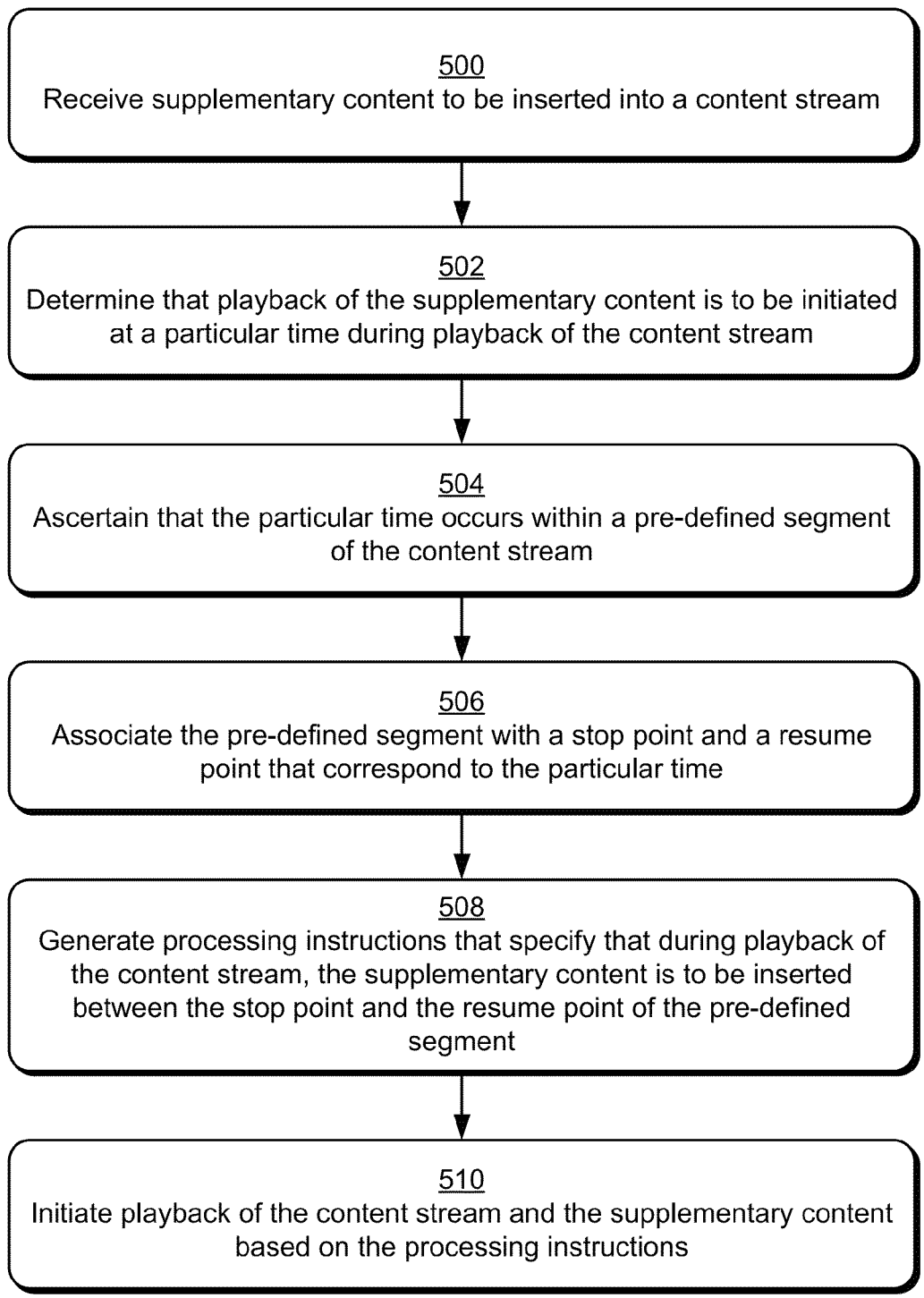
FIG. 5 is a flow diagram that describes steps in a method in accordance with one or more embodiments.

FIG. 5 is a flow diagram that describes steps in a method in accordance with one or more embodiments. The method presents an example way for inserting supplementary content into a segment of a content stream, such as described above with reference to FIG. 2.

Step 500 receives supplementary content to be inserted into a content stream. The content stream, for example, can correspond to a pre-specified stream of primary content. As discussed above, supplementary content can include advertisements, event notifications, public service announcements, and so forth. In at least some embodiments, the supplementary content can be received prior to playback of the content stream having started. Alternatively or additionally, the supplementary content can be received after playback of the content stream is initiated.

Step 502 determines that playback of the supplementary content is to be initiated at a particular time during playback of the content stream. Data for the supplementary content, for example, can specify a particular time point during playback of the content stream at which playback of the supplementary content is to be initiated.

Step 504 ascertains that the particular time occurs within a pre-defined segment of the content stream. The content stream, for example, can be segmented utilizing techniques for adaptive bitrate streaming. As detailed above, the segments can define discrete portions of the content stream. Thus, the particular playback time specified for the supplementary content can fall within a particular segment.

Step 506 associates the pre-defined segment with a stop point and a resume point that correspond to the particular time. Example implementations of a stop point and a resume point are discussed above. In at least some embodiments, the stop point and the resume point correspond to the same time point in a segment.

According to one or more embodiments, associating a stop point and a resume point with a segment can include generating a duplicate of the segment, marking the original segment with the stop point, and marking the duplicate of the segment with a stop point. As further discussed above, a manifest for the content stream can be modified to identify the supplementary content, as well as data markers for the stop point and the resume point for the pre-defined segment. Thus, playback of the content stream can be managed based on the modified manifest to enable insertion and playback of the supplementary content.

Step 508 generates processing instructions that specify that during playback of the content stream, the supplementary content is to be inserted between the stop point and the resume point of the pre-defined segment. The processing instructions, for example, can specify that during playback of the content stream, the pre-defined segment is to stop at the stop point and playback of the supplementary content is to be initiated, and that playback of the pre-defined segment is to resume from the resume point after playback of the supplementary content is finished. The processing instructions can be included in and/or based on a modified manifest for the content stream, as detailed above.

Step 510 initiates playback of the content stream and the supplementary content based on the processing instructions.

Figure 6:
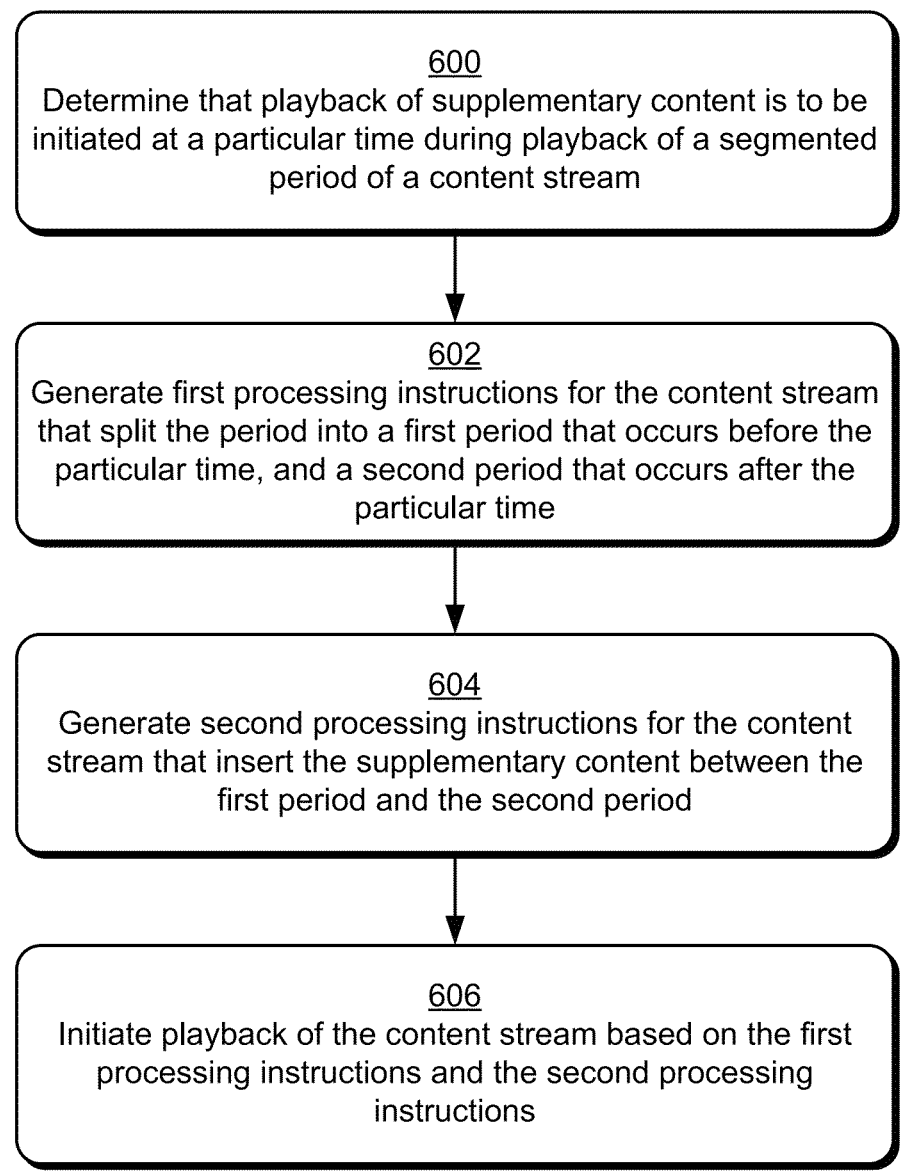
FIG. 6 is a flow diagram that describes steps in a method in accordance with one or more embodiments.

FIG. 6 is a flow diagram that describes steps in a method in accordance with one or more embodiments. The method presents an example way of inserting supplementary content into a segmented period of a content stream, such as described above with reference to FIG. 3.

Step 600 determines that playback of supplementary content is to be initiated at a particular time during playback of a segmented period of a content stream. As discussed above, a portion of a content stream can be defined via a period that includes multiple segments. A period, for example, can correspond to a particular instance of content defined for a content stream. Segments of the period can correspond to discrete portions of the instance of content.

Step 602 generates first processing instructions for the content stream that split the period into a first period that occurs before the particular time, and a second period that occurs after the particular time. Thus, in at least some embodiments, the particular time is used as a split point that splits the period into two periods.

Step 604 generates second processing instructions for the content stream that insert the supplementary content between the first period and the second period. According to one or more embodiments, the second processing instructions may define the supplementary content as a third period that occurs between the first period and the second period. The second processing instructions can specify, for example, that playback of the supplementary content is to be initiated after playback of the first period is complete, and that playback of the second period is to be initiated after playback of the supplementary content is complete.

The processing instructions can be included in and/or based on a manifest for the content stream, as detailed above. Thus, in at least some embodiments, a single manifest can be used to manage playback of the first period, the second period, and the supplementary content.

Step 606 initiates playback of the content stream based on the first processing instructions and the second processing instructions.

While embodiments are discussed with respect to inserting a single instance of supplementary content into a period of a content stream, this is not intended to be limiting. Techniques discussed herein, for example, can be employed to insert multiple instances of supplementary content into a period, such as by dividing the period in multiple places and inserting multiple instances of supplementary content.

According to one or more embodiments, an insertion point for supplementary content may occur within a segment of a period. Thus, techniques discussed above for inserting supplementary content within a segment can be combined with the techniques for inserting supplementary content within a period to accommodate processing of both a period and a segment within the period for insertion of supplementary content.

Figure 7:
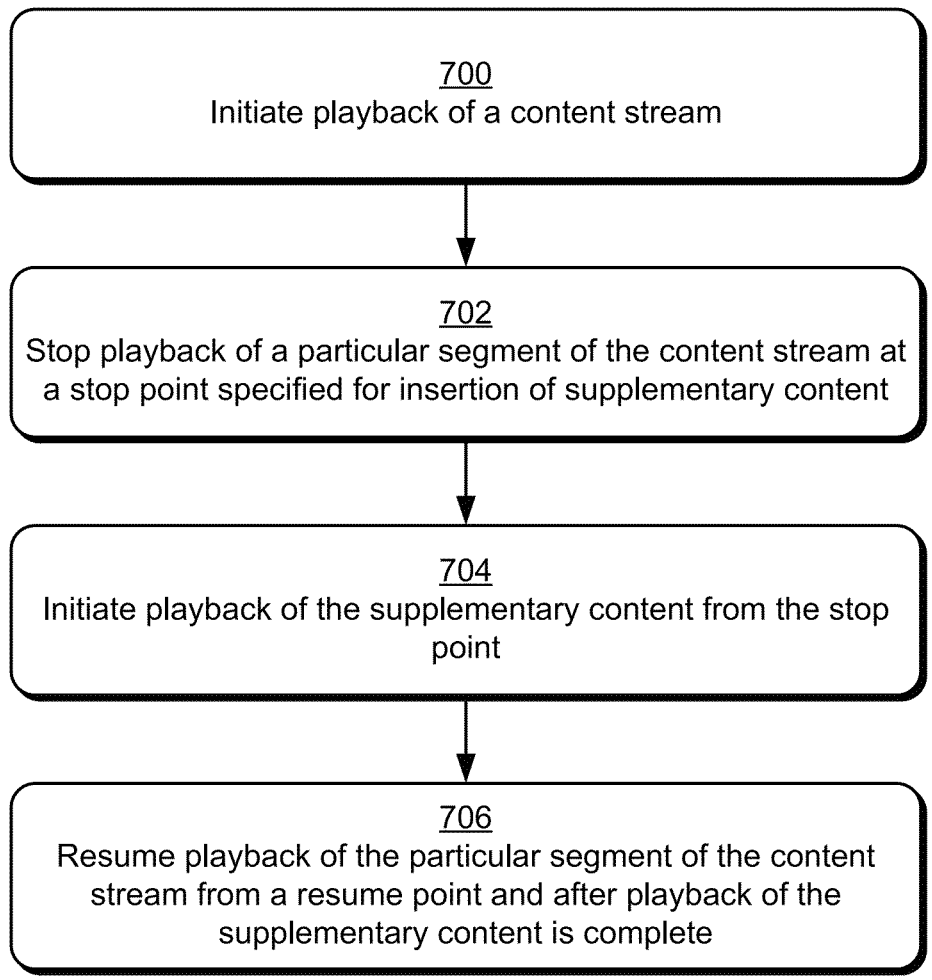
FIG. 7 is a flow diagram that describes steps in a method in accordance with one or more embodiments.

FIG. 7 is a flow diagram that describes steps in a method in accordance with one or more embodiments. The method presents an example way of inserting supplementary during playback of a content stream, such as based on execution of processing instructions generated as discussed above.

Step 700 initiates playback of a content stream. The playback, for example, can be based on a modified manifest for the content stream.

Step 702 stops playback of a particular segment of the content stream at a stop point specified for insertion of supplementary content. As discussed above, the stop point can be defined based on a specified playback time for supplementary content.

Step 704 initiates playback of the supplementary content from the stop point. Playback of the supplementary content, for example, can be initiated in response to a time point associated with the stop point being detected during playback of the content stream.

Step 706 resumes playback of the particular segment of the content stream from a resume point and after playback of the supplementary content is complete. The resume point, for example, can correspond to the stop point in the particular segment such that portions of the segment are not skipped during playback. This is not intended to be limiting, however, and a resume point can be specified at different portions of a content stream. A resume point, for example, can be defined at a later and/or earlier point of a segment than a stop point in the segment. Alternatively or additionally, a resume point can be defined in a different segment of a content stream.

The method described above may be implemented to play supplementary content that is inserted into a period of a content stream according to techniques discussed above. For example, consider that a period of a content stream is split into a first period and a second period to accommodate insertion of supplementary content. The stop point can reside within a segment of the first period, and the resume point can reside in a duplicate of the segment included in the second period. Thus, supplementary content can be inserted between the first period and the second period, e.g., as a third period. Playback of the first period can stop at the stop point and playback of the supplementary content can be initiated. After playback of the supplementary content is complete, playback of the second period can be initiated from the resume point.

Figure 8:
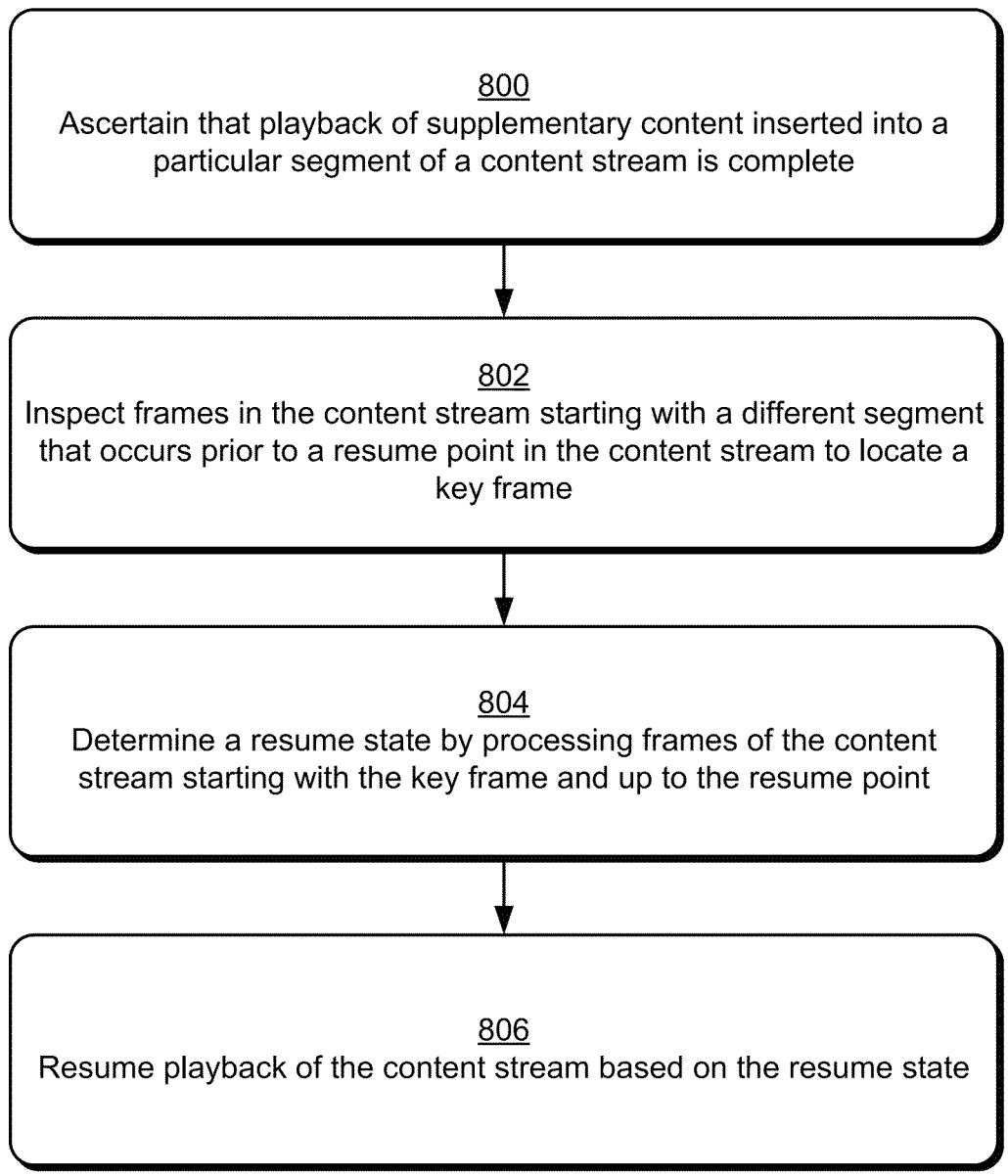
FIG. 8 is a flow diagram that describes steps in a method in accordance with one or more embodiments.

FIG. 8 is a flow diagram that describes steps in a method in accordance with one or more embodiments. The method describes an example way for resuming playback of primary content of a content stream after playback of supplementary content inserted into the content stream is complete. The method, for example, presents a detailed implementation of step 706 described above in the discussion of FIG. 7.

Step 800 ascertains that playback of supplementary content inserted into a particular segment of a content stream is complete.

Step 802 inspects frames in the content stream starting with a different segment that occurs prior to a resume point in the content stream to locate a key frame. The different segment, for example, can correspond to a segment that occurs temporally prior to the particular segment in the content stream. The resume point corresponds to a point in the content stream at which playback is to resume after playback of the supplementary content.

In at least some embodiments, frames of the content stream can be inspected starting at the temporal beginning of the different segment and working forward up to a resume point until a key frame is located. Alternatively, the frames of the content stream can be inspected starting at the resume point and working backward, e.g., in a reverse temporal order. These ways of processing a segment to obtain a key frame are presented for purpose of example only, and a wide variety of different processing techniques can be employed to obtain a key frame from a segment of a content stream.

Step 804 determines a resume state by processing frames of the content stream starting with the key frame and up to the resume point. Generally, the resume state corresponds to a data state (e.g., video data state, audio data state, and so forth) of the content stream at the point at which the content stream was paused (e.g., a stop point) to insert and playback the supplementary content. Alternatively, the resume state may occur at a different point in the content stream, such as prior or subsequent to a stop point. Thus, resuming playback of a content stream may include repeating some frames that were previously played, or skipping some frames. According to various embodiments, once the resume state is determined, the processed content data is discarded without being played back.

Step 806 resumes playback of the content stream based on the resume state. For example, as discussed above, playback of the content stream was paused at a specific point of the particular segment to initiate playback of the supplementary content. Thus, playback of the content stream can be resumed from the specific point of the particular segment and utilizing data of the resume state. Alternatively, playback of the content stream can be resumed from a different point, such as prior or subsequent to the point at which the content stream was paused for insertion of supplementary content.

Thus, embodiments enable supplementary content to be inserted at any specified point in a content stream, such as between boundaries of a segment and/or a period. Embodiments further enable playback of a content stream to resume after supplementary content has been inserted.

Having discussed some example procedures, consider now a discussion of an example system and device in accordance with one or more embodiments.

Example System and Device

Figure 9:
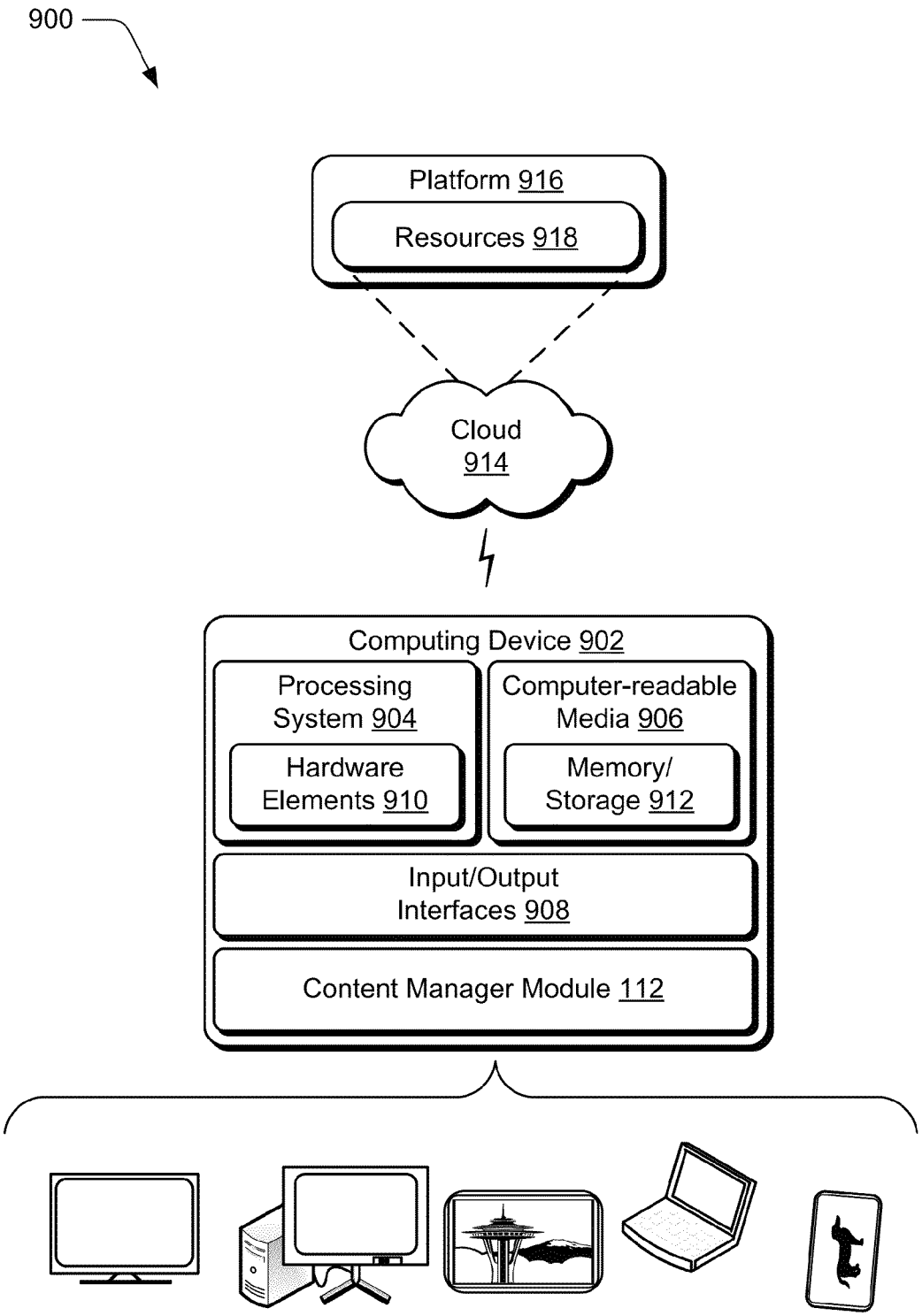
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement the various techniques described herein. This is illustrated through inclusion of the content manager module 112, which may be employed to implement techniques for insertion of supplementary content into a segmented content stream discussed herein. The computing device 902 may be, for example, a server of a service provider, a device associated with a client (e.g., a client device), an on-chip system, and/or any other suitable computing device or computing system. In at least some implementations, the computing device 902 represents an example embodiment of the consumer device 102 of environment 100.

The computing device 902 as illustrated includes a processing system 904, one or more computer-readable media 906, and one or more I/O interfaces 908 that are communicatively coupled and/or connected, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 are illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100, the system 900, and so on.

CONCLUSION

Techniques for insertion of supplementary content into a segmented content stream are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. One or more computer-readable storage media comprising instructions stored thereon that, responsive to execution by a computing device, cause the computing device to perform operations comprising:
   determining that playback of supplementary content is to be initiated at a particular time during playback of a segmented period of a content stream; and
   generating processing instructions for the content stream that, when executed:
      split the period into a first period that includes one or more segments of the content stream and that occur before the particular time, and a second period that includes one or more other segments of the content stream and that occur after the particular time;
      ascertain that the particular time occurs within a segment of the period;
      generate a duplicate of the segment;
      place the segment at the end of the first period and the duplicate of the segment in the second period;
      mark the segment with a stop point that corresponds to the particular time and mark the duplicate of the segment with a resume point;
      insert the supplementary content between the first period and the second period such that during playback of the content stream, playback of the content stream is to stop at the stop point in the segment and playback of the supplementary content is to be initiated, and that playback of the content stream is to resume at the resume point of the duplicate segment after playback of the supplementary content.

2. One or more computer-readable storage media as recited in claim 1, wherein the supplementary content comprises an advertisement.

3. One or more computer-readable storage media as recited in claim 1, wherein the supplementary content is received from a different source than the content stream.

4. One or more computer-readable storage media as recited in claim 1, wherein the operations further comprise modifying a manifest for the content stream based on the processing instructions to generate a modified manifest.

5. One or more computer-readable storage media as recited in claim 4, wherein the operations further comprise using the modified manifest to manage playback of the first period and the second period during playback of the content stream.

6. One or more computer-readable storage media as recited in claim 1, wherein the operations further comprise defining the supplementary content as a third period placed between the first period and the second period.

7. One or more computer-readable storage media as recited in claim 1, wherein the operations further comprise:
   initiating playback of the first period and the supplementary content based on the processing instructions;
   after playback of the supplementary content, determining a resume state utilizing a key frame retrieved from an initial segment of the second period; and
   initiating playback of the second period based on the resume state.

8. One or more computer-readable storage media as recited in claim 7, wherein determining the resume state comprises processing content data of the content stream starting with the key frame and up to a point at which playback of the second period is to be resumed.

9. One or more computer-readable storage media as recited in claim 1, wherein the processing instructions are configured to be executed at a consumer device and after playback of the content stream is initiated at the consumer device.

10. A system comprising:

one or more processors; and one or more computer-readable storage media comprising instructions stored thereon that, responsive to execution by the one or more processors, cause the system to perform operations including:

determining that playback of supplementary content is to be initiated at a particular time during playback of a segmented period of a content stream; and generating processing instructions for the content stream that, when executed:

split the period into a first period that includes one or more segments of the content stream and that occur before the particular time, and a second period that includes one or more other segments of the content stream and that occur after the particular time;

ascertain that the particular time occurs within a segment of the period;

generate a duplicate of the segment;

place the segment at the end of the first period and the duplicate of the segment in the second period;

mark the segment with a stop point that corresponds to the particular time and mark the duplicate of the segment with a resume point;

insert the supplementary content between the first period and the second period such that during playback of the content stream, playback of the content stream is to stop at the stop point in the segment and playback of the supplementary content is to be initiated, and that playback of the content stream is to resume at the resume point of the duplicate segment after playback of the supplementary content.

11. A system as recited in claim 10, wherein the supplementary content comprises an advertisement.

12. A system as recited in claim 10, wherein the supplementary content is received from a different source than the content stream.

13. A system as recited in claim 10, wherein the operations further comprise modifying a manifest for the content stream based on the processing instructions to generate a modified manifest.

14. A system as recited in claim 10, wherein the operations further comprise defining the supplementary content as a third period placed between the first period and the second period.

15. A system as recited in claim 10, wherein the operations further comprise:

initiating playback of the first period and the supplementary content based on the processing instructions; after playback of the supplementary content, determining a resume state utilizing a key frame retrieved from an initial segment of the second period; and initiating playback of the second period based on the resume state.

16. A system as recited in claim 15, wherein determining the resume state comprises processing content data of the content stream starting with the key frame and up to a point at which playback of the second period is to be resumed.

17. A computer-implemented method, comprising:

determining that playback of supplementary content is to be initiated at a particular time during playback of a segmented period of a content stream;

splitting the period into a first period that includes one or more segments of the content stream and that occur before the particular time, and a second period that includes one or more other segments of the content stream and that occur after the particular time;

ascertaining that the particular time occurs within a segment of the period;

generating a duplicate of the segment;

placing the segment at the end of the first period and the duplicate of the segment in the second period;

marking the segment with a stop point that corresponds to the particular time and mark the duplicate of the segment with a resume point;

inserting the supplementary content between the first period and the second period such that during playback of the content stream, playback of the content stream is to stop at the stop point in the segment and playback of the supplementary content is to be initiated, and that playback of the content stream is to resume at the resume point of the duplicate segment after playback of the supplementary content.

18. A computer-implemented method as recited in claim 17, further comprising modifying a manifest for the content stream based on the processing instructions to generate a modified manifest.

19. A computer-implemented method as recited in claim 17, further comprising defining the supplementary content as a third period placed between the first period and the second period.

20. A computer-implemented method as recited in claim 17, further comprising:

initiating playback of the first period and the supplementary content based on the processing instructions; after playback of the supplementary content, determining a resume state utilizing a key frame retrieved from an initial segment of the second period; and initiating playback of the second period based on the resume state.

* * * * *